United States Patent [19]
Ueda et al.

[11] Patent Number: 5,886,760
[45] Date of Patent: Mar. 23, 1999

[54] MICROLENS-ARRAY, PRODUCTION METHOD THEREOF, AND LIQUID CRYSTAL DISPLAY DEVICE USING THE SAME

[75] Inventors: Kayoko Ueda; Akiko Shimizu, both of Osaka-fu, Japan

[73] Assignee: Sumitomo Chemical Company, Limited, Osaka, Japan

[21] Appl. No.: 782,492

[22] Filed: Jan. 10, 1997

[30] Foreign Application Priority Data

Jan. 10, 1996 [JP] Japan .................................. 8-002212
Feb. 7, 1996 [JP] Japan .................................. 8-021096

[51] Int. Cl.⁶ .......................... G02F 1/1335; G02B 27/10
[52] U.S. Cl. .............................. 349/95; 359/619; 359/620
[58] Field of Search ............................. 349/95; 359/619, 359/620, 455, 456; 264/2.5

[56] References Cited

U.S. PATENT DOCUMENTS

| | | | |
|---|---|---|---|
| 4,986,633 | 1/1991 | Ohta | 350/167 |
| 5,300,263 | 4/1994 | Hoopman et al. | 264/2.5 |
| 5,442,482 | 8/1995 | Johnson et al. | 359/619 |
| 5,453,876 | 9/1995 | Hamada | 359/625 |
| 5,581,379 | 12/1996 | Aoyama et al. | 349/5 |
| 5,623,268 | 4/1997 | Calderini et al. | 359/619 |
| 5,737,084 | 4/1998 | Ishihara | 356/376 |
| 5,739,548 | 4/1998 | Shigeta et al. | 257/59 |

OTHER PUBLICATIONS

Patent Abstracts of Japan, Publication No. 62–56930, published Mar. 12, 1987.
Patent Abstracts of Japan, Publication No. 2–108093, published Apr. 19, 1990.
Patent Abstracts of Japan, Publication No. 5–196927, published Aug. 6, 1993.
Patent Abstracts of Japan, Publication No. 6–230358, published Aug. 19, 1994.
Patent Abstracts of Japan, Publication No. 07–072469, published Mar. 17, 1995.
Patent Abstracts of Japan, Publication No. 07–043704, published Feb. 14, 1995.
Patent Abstracts of Japan, Publication No. 07–072471, published Mar. 17, 1995.

*Primary Examiner*—Hung X. Dang
*Assistant Examiner*—Tiep H. Nguyen
*Attorney, Agent, or Firm*—Sughrue, Mion, Zinn, Macpeak & Seas, PLLC

[57] ABSTRACT

A microlens-array containing a mesh-like sheet and an optically-transparent resin formed at apertures of the mesh-like sheet, wherein the resin formed at each aperture has a concave lens shape; and method for production thereof. A liquid crystal display device using the aforementioned microlens-array.

45 Claims, 3 Drawing Sheets

MICROLENS-ARRAY, PRODUCTION METHOD THEREOF, AND LIQUID CRYSTAL DISPLAY DEVICE USING THE SAME

FIELD OF THE INVENTION

The present invention is a microlens-array for a liquid crystal display, a production method thereof, and a liquid crystal display device using the microlens-array.

BACKGROUND OF THE INVENTION

Due to sch characteristics as thinness, light weight, and high picture quality, a liquid crystal display device can compete with a cathode ray tube (CRT) as a display device. Various addressing modes of the liquid crystal display device include a twisted nematic (TN) type, a super twisted nematic (STN) type, a ferroelectric liquid crystal (FLC) type, antiferroelectric liquid crystal (AFLC) type, or a polymer dispersion type. A liquid crystal display device with multicolor and high definition is commercially sold.

With the growing demand for a large area display and excellent viewing characteristics, an enlarging projection type display device is increasingly desired.

Most of the liquid crystal display devices mainly use the TN or STN as the addressing mode. However, such addressing modes have the drawback that the display quality changes depending upon the angle of the observation. Polymer dispersed type liquid crystal display devices, which are increasingly desired due to production ease and display brightness (achieved as a result of not using a polarizing plate), have the same problem.

In general, since these liquid crystal display devices are designed so as to provide best display quality when observed along the normal to the display plane, the display quality deteriorates as the angle made between the normal to the display plane and the observation direction becomes larger. That is, these devices disadvantageously have a narrow satisfactory angle of view.

Attempts to widen the satisfactory viewing angle of the liquid crystal display include methods for expanding the angle range to which a light beams having good display quality can be provided such as setting an optical element such as a microlens-array on a liquid crystal display device at the side from which the device is observed.

Examples of such methods include: a method of mounting a light guiding plate and a scattering plate as disclosed in the Japanese Patent Publication Laid Open (Kokai) Hei No. 5-196927; a method of mounting two sheets of orthogonally arranged unidimensional microlens-array as disclosed in the Japanese Patent Application Laid Open (Kokai) Hei No. 7-43704; a method of mounting a transparent plate having transparent micro beads arranged thereon in high density as disclosed in the Japanese Patent Application Laid Open Kokai) Hei No. 7-72469; a method of mounting a material prepared by thinly slicing a bundle consisting of many optical fibers as disclosed in the U.S. Pat. No. 5,329,386; and a method of arranging a lens on each display unit of a liquid crystal cell as disclosed in the Japanese Patent Applications Laid Open (Kokai) Sho No. 62-56930, Hei No. 2-108093, and Hei No. 6-230358.

However, aforementioned production methods of a microlens-array have problems. That is, since they require strict control of the structure, such as the prerequisite that the production technology be able to make micro beads having a uniform diameter (as disclosed in the Japanese patent Applications Laid Open (Kokai) Hei Nos. 5-196927 and 7-72469) and the necessity of a lithography process, the number of production process steps should increase. Moreover, as to the method of arranging a lens on each display unit of the liquid crystal cell, the production process inevitably becomes difficult since the method requires the strict control of the position and size of the display unit and the lens in order to realize its sufficient effect.

SUMMARY OF THE INVENTION

An object of the present invention is to provide a microlens-array which expands the satisfactory viewing angle range of a liquid crystal display device and which can be produced by a conventional method.

Another object is to provide a liquid crystal display device having a wide, satisfactory viewing angle range which uses the aforementioned microlens-array.

The present invention relates to a microlens-array comprising a mesh-like sheet and an optically-transparent resin formed at apertures of the mesh-like sheet, wherein the resin formed at each aperture has a concave lens shape.

The present invention further relates to a production method of the aforementioned microlens-array comprising the steps of providing a mesh-like sheet on an optically transparent substrate, applying at least one polymerizable compound or a composition containing the at least one polymerizable compound onto the mesh-like sheet, and polymerizing the at least one polymerizable compound; and a production method of the aforementioned microlens-array comprising the steps of applying at least one polymerizable compound or a composition containing the polymerizable compound on an optically transparent substrate, arranging a mesh-like sheet thereon, and polymerizing the at least one polymerizable compound. In the foregoing methods, the at least one polymerizable compound forms a concave shape at each aperture of the mesh-like sheet.

The present invention further relates to a liquid crystal display device, comprising a light source unit, a liquid crystal cell and a microlens-array provided at the side from which the liquid crystal cell is observed by an observer, wherein the microlens-array comprising a mesh-like sheet and optically-transparent resin formed at apertures of the mesh-like sheet, and wherein the resin at each aperture of the mesh-like sheet has concave lens shape; and a liquid crystal display device, comprising a light source unit, a back side polarizing plate, a liquid crystal cell, a front side polarizing plate and a microlens-array, wherein the microlens-array is provided at the side from which the liquid crystal cell is observed by an observer and is located closer to the observer than the front side polarizing plate; and wherein the microlens-array comprises a mesh-like sheet and an optically-transparent resin formed at the apertures of the mesh-like sheet and the optically-transparent resin formed at each aperture has a concave lens shape.

BRIEF DESCRIPTION OF THE DRAWINGS

The numerals in FIGS. 1 to 5 represent the following: numeral 1 represents the transparent substrate; numeral 2 represents the mesh-like sheet; numeral 3 represents the resin; numeral 4 represents the microlens-array; numeral 5 represents the luminance meter; and numeral 6 represents the liquid crystal color television.

DETAILED DESCRIPTION OF THE INVENTION

Figure 1:
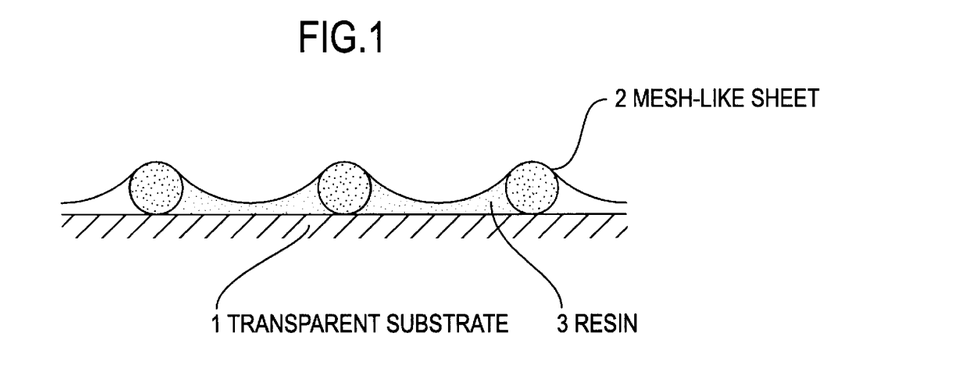
FIG. 1 is an enlarged cross-sectional view of a microlens-array of the present invention.

FIG. 1 is an enlarged cross-sectional view of a microlens-array of the present invention. A mesh-like sheet 2 is mounted on a transparent substrate 1, and an optically-transparent resin 3 is formed at apertures of the mesh-like sheet, wherein the resin at each aperture has a concave lens shape.

Transparent substrates used for the microlens-array of the present invention are not particularly limited as long as they are optically-transparent. Examples thereof include glass and plastic films.

The microlens-array of the present invention may be used with the optically transparent substrate or the microlens-array may be used without the optically transparent substrate (once the optically transparent substrate is pealed away). Furthermore, the microlens-array of the present invention can be provided directly on a polarizing plate.

The mesh-like sheet of the present invention may be made of materials which are not particularly limited. Examples of the materials include natural fibers such as cotton, linen and silk; synthetic fibers such as nylon, polyester, polyethylene and polypropylene; metal fibers such as stainless steel; and glass fibers. Among these, synthetic fibers such as nylon and polyester are particularly preferable due to their ease in handling. Generally, the fibers are woven fabrics.

The aperture ratio of the mesh-like sheet is preferably 50% or more, more preferably 60% or more in view of the brightness when applied to a liquid crystal display device.

Size of average aperture (size of mesh) of the mesh-like sheet in the present invention can be suitably selected depending on the application. For example, when the microlens-array is used for expanding the viewing angle range of a liquid crystal display, the size of mesh is selected according to the size of the pixel of the liquid crystal cell to be mounted. In general, a mesh-like sheet of 100 to 600 mesh is preferable in view of the visibility of a display and the transmissivity of light when applied to a liquid crystal display device. Herein, a number of mesh means a number of apertures per one inch.

For the optimum performance of the microlens-array, the mesh-like sheet preferably has substantially the same area in each of the apertures. Examples of methods for obtaining the mesh-like sheet with apertures having substantially the same area in each include a method comprising weaving fibers, a method comprising printing lattices by screen printing, and the like. A method comprising weaving fibers is preferred in view of its availability and handling.

Although the aperture pitch and aperture ratio generally depend upon the mesh-like sheet to be used, generally, the size of the fibers is preferably 100 $\mu$m or less, more preferably 60 $\mu$m or less, in view of its visibility of a display when applied to a liquid crystal display device.

The resins formed at the apertures of a mesh-like sheet are not particularly limited as long as they are optically-transparent. These optically-transparent resins can be obtained by polymerizing at least one polymerizable compound or a composition containing the at least one polymerizable compound. Herein, the at least one polymerizable compound or the composition containing the at least one polymerizable compound may be collectively referred as "said polymerizable compound". Said polymerizable compounds include polymerizable oligomers.

In order to adjust the viscosity of said polymerizable compounds to within a preferred viscosity range, two or more kinds of said polymerizable compounds may be mixed, or a reactive or non-reactive third component such as a polymerization initiator and a solvent may be further added.

Since the microlens-array of the present invention contains a resin which has a concave lens shape (or menicus shape) at the apertures of a mesh-like sheet, said polymerizable compound with which the mesh-like sheet is impregnated preferably has a comparatively low viscosity prior to polymerization.

The viscosity of said polymerizable compound at the time of impregnation is preferably 5 Pa·s or less, more preferably 3 Pa·s or less. The viscosity of said polymerizable compound may be lowered to within a preferred range by applying heat during the impregnation.

By impregnating the mesh-like sheet with said polymerizable compound mentioned above and polymerizing the compound, the surface of the resin (formed at each apertures of the mesh-like sheet) becomes a meniscus shape as illustrated in FIG. 1 so as to function as a concave lens.

Methods of impregnating the mesh-like sheet with said polymerizable compound are not particularly limited, and a known method can be used.

Examples of the impregnation methods include a method comprising mounting the mesh-like sheet on the transparent substrate followed by applying said polymerizable compound thereon to impregnate the mesh-like sheet with said polymerizable compound; and a method comprising applying said polymerizable compound onto the transparent substrate in any known way, arranging the mesh-like sheet thereon to impregnate the mesh-like sheet with said polymerizable compound. Too much of said polymerizable compound will cause exudation of said polymerizable compound from the surface of the sheet, resulting in difficulty in forming the resin having a meniscus shape at the apertures of the minicus sheet. In the case of the latter method, said polymerizable compound should be applied to the transparent substrate so as to have a thickness which is the same as or less than the thickness of the mesh-like sheet.

After impregnating the mesh-like sheet with said polymerizable compound, a meniscus shape formed at the apertures of the mesh-like sheet needs to be fixed. Methods of fixing the meniscus shape include a method comprising impregnating with said polymerizable compound and polymerizing the polymerizable compound, and a method comprising applying heat and impregnating with said polymerizable compound and then cooling. With respect to the ease of production and the durability of the obtained sheet, the former method is more preferably used.

Methods of polymerizing the polymerizable compound include a method comprising curing the resin by using an energy beam with a UV ray or an electron beam and a method comprising curing the resin by thermosetting. In order to more stably maintain the meniscus shape during the polymerization reaction (which shape was at the time of impregnation), curing by using the energy beam is more preferred.

Said polymerizable compounds capable of being cured with an energy beam are compounds which can be polymerized by an energy beam, and such compound have a viscosity of preferably 5 Pa·s or less at the time of impregnation. More preferably, the polymerizable compounds have at least one (meth)acrylate group.

Examples of such polymerizable compounds include:
(1) poly(meth)acrylate of polyhydric alcohols such as trimethylolpropane tri(meth)acrylate, trimethylolethane tri(meth)acrylate, pentaglycerol tri(meth)acrylate, pentaerythritol tri(meth)acrylate, pentaerythritol tetra(meth)acrylate, glycerol tri(meth)acrylate, dipentaerythritol tri(meth)acrylate, dipentaerythritol tetra(meth)acrylate, dipentaerythritol penta(meth)acrylate, dipentaerythritol hexa(meth)acrylate, tripentaerythritol tetra(meth)acrylate, tripentaerythritol penta(meth)acrylate, 2,2-bis(4-(meth)acryloxyethoxyphenyl)propane, diethyleneglycol di(meth)acrylate, triethyleneglycol di(meth)acrylate, tetraethyleneglycol di(meth)acrylate, tripentaerythritol hexa(meth)acrylate, and tripentaerythritol hepta(meth)acrylate;
(2) saturated or unsaturated polyester poly(meth)acrylate provided by a combination of compounds such as malonic acid/trimethylolethane/(meth)acrylic acid, malonic acid/trimethylolpropane/(meth)acrylic acid, malonic acid/glycerol/(meth)acrylic acid, malonic acid/pentaerythritol/(meth)acrylic acid, succinic acid/trimethylolethane/(meth)acrylic acid, succinic acid/trimethylolpropane/(meth)acrylic acid, succinic acid/glycerol/(meth)acrylic acid, succinic acid/pentaerythritol/(meth)acrylic acid, adipic acid/trimethylolethane/(meth)acrylic acid, adipic acid/trimethylolpropane/(meth)acrylic acid, adipic acid/pentaerythritol/(meth)acrylic acid, adipic acid/glycerol/(meth)acrylic acid, glutaric acid/trimethylolethane/(meth)acrylic acid, glutaric acid/trimethylolpropane/(meth)acrylic acid, glutaric acid/glycerol/(meth)acrylic acid, glutaric acid/pentaerythritol/(meth)acrylic acid, sebacic acid/trimethylolethane/(meth)acrylic acid, sebacic acid/trimethylolpropane/(meth)acrylic acid, sebacic acid/glycerol/(meth)acrylic acid, sebacic acid/pentaerythritol/(meth)acrylic acid, fumaric acid/trimethylolethane/(meth)acrylic acid, fumaric acid/trimethylolpropane/(meth)acrylic acid, fumaric acid/glycerol/(meth)acrylic acid, fumaric acid/pentaerythritol/(meth)acrylic acid, itaconic acid/trimethylolethane/(meth)acrylic acid, itaconic acid/trimethylolpropane/(meth)acrylic acid, itaconic acid/pentaerythritol/(meth)acrylic acid, maleic anhydride/trimethylolethane/(meth)acrylic acid, and maleic anhydride/glycerol/(meth)acrylic acid;
(3) urethane (meth)acrylate usually obtained by reacting 2 moles or more of a (meth)acryl monomer having active hydrogen, such as 2-hydroxyethyl (meth)acrylate, 2-hydroxypropyl (meth)acrylate, 2-hydroxy-3-methoxypropyl (meth)acrylate and N-methylol (meth)acrylamide, with 1 mole of isocyanate of an isocyanate-containing compound, such as diisocyanate compounds including tolylene diisocyanate, xylylene diisocyanate, diphenyl methane diisocyanate, isophorone diisocyanate, hexamethylene diisocyanate and dicyclohexyl methane diisocyanate; diisocyanate compounds obtained by hydrogenating the above-mentioned diisocyanate compounds comprising an aromatic group isocyanate (such as diisocyanate compounds including hydrogenated xylylene diisocyanate and hydrogenated diphenyl methane diisocyanate); and polyisocyanate compounds obtained by polymerizing diisocyanate compounds, or divalent or trivalent polyisocyanate compounds such as triphenylmethane triisocyanate and dimethylene triphenyl triisocyanate;
(4) tri(meth)acrylate of tris(2-hydroxyethyl)isocyanuric acid, and (5) epoxy(meth)acrylate of bisphenol A derivatives, of bisphenol F derivatives, and of bisphenol S derivatives.

In order to improve the curing property of said polymerizable compounds, it is preferable to use a photopolymerization initiator. Examples of the photopolymerization initiator include benzophenone, benzil, Michler's ketone, 2-chlorothioxantone, 2,4-diethylthioxantone, benzoin ethyl ether, diethoxyacetophenone, benzil dimethyl ketal, 2-hydroxy-2-methylpropiophenone, and 1-hydroxycyclohexyl phenyl ketone.

In the microlens-array of the present invention, in order to reduce the scattering at the interface of the mesh-like sheet and the resin and to reduce the reflected light, materials comprising the mesh-like sheet and the resin may have the substantially the same refractive index, or the mesh-like sheet may be covered or dyed with a shading material such as a pigment or a dye having a shading property.

The method of having the mesh-like sheet covered or dyed with a shading material is preferred from the viewpoint of shielding light beams from an oblique direction (which cause deterioration of image quality when applied to a liquid crystal panel).

In the present invention, a liquid crystal display device to which the above-mentioned microlens-array is mounted, is not particularly limited as long as it basically comprises a light source unit and a liquid crystal cell, and is a type which displays pictures by changing the optical anisotropy of the liquid crystal layer by the electric field. Examples of such types which are capable of achieving a great effect in terms of expanding the viewing angle range by providing the microlens-array of the present invention include a TN mode, an STN mode, an ECB mode, a GH mode, an FLC mode, an AFLC mode and a polymer dispersed type.

Furthermore, in the liquid crystal display device of the present invention, since the microlens-array has the effect of expanding a light beam in the normal direction of the liquid crystal cell (which is the light beam having the excellent display quality) to wider angle sides, the microlens-array needs to be arranged at the side from which the liquid crystal cell is observed. When a polarizing plate is provided at the side from which the liquid crystal cell is observed, it is preferable to arrange the microlens-array closer to the observer's side than the polarizing plate.

In general, the microlens-array is provided by attaching with an adhesive.

In a liquid crystal display device having a front (or observer's side) polarizing plate, the microlens-array may be formed directly on a polarizing plate. In a display device which does not require a polarizing plate (such as a GH mode type device and a polymer dispersed type device), the microlens-array may be mounted on a transparent substrate at the side from which the liquid crystal cell is observed, or a transparent substrate having the microlens-array formed thereon may be provided at the side from which the liquid crystal cell is observed.

Further, in the liquid crystal display device of the present invention, since a viewing angle range is expanded by expanding the light beam in the normal direction of the display plane to wider angle sides by means of the microlens-array arranged at the side from which the liquid crystal cell is observed, one or more pieces of lens sheets or prism sheets, having an effect to collect light beams from the light source unit to the normal direction, may be arranged between light source unit and the liquid crystal cell. Examples of the lens sheet or the prism sheet include triangular prisms juxtaposed to form a sheet-like shape, a plurality of pyramids or cones juxtaposed to form a sheet-like shape, a plurality of elliptical cylindrical plano-convex lenses juxtaposed to form a sheet-like shape, a plurality of elliptical spherical plano-convex lenses juxtaposed to form a sheet-like shape, a plurality of cylindrical plano-concave lenses juxtaposed to form a sheet-like shape, a plurality of spherical plano-concave lenses to form a sheet-like shape, a prism sheet having the top portion flattened, a plurality of lenses comprising pyramids or cones having the top portion flattened juxtaposed to form a sheet-like shape, and a sheet having the cross-sectional profile like a sine wave.

The microlens-array of the present invention expands the viewing angle range of a liquid crystal display device and can be produced by a conventional method. Further, the focal length of the microlens-array can be easily controlled by changing the size of the mesh of the mesh-like sheet, the viscosity of said polymerizable compound, the refractive index, impregnation conditions, and the like. Thus, the microlens-array of the present invention can be produced in an easier manner than those prodeced by conventional methods (such as a method using a photolithograpy).

Furthermore, by providing the microlens-array of the present invention, a liquid crystal display device having a wider viewing angle range is obtained.

The present invention will further be described by way of the following experimentation, but the present invention is not to be construed as being limited thereby. Unless otherwise indicated, all precentages, ratios and the like are by weight.

Preliminarily, Measurement methods used in the Examples are explained as follows.

(1) Measurement of the surface shape

The surface shape of the samples were measured with a needle-contact type surface roughness tester "Safukomu 30C type" produced by TOKYO SEIMITSU.

Figure 2:
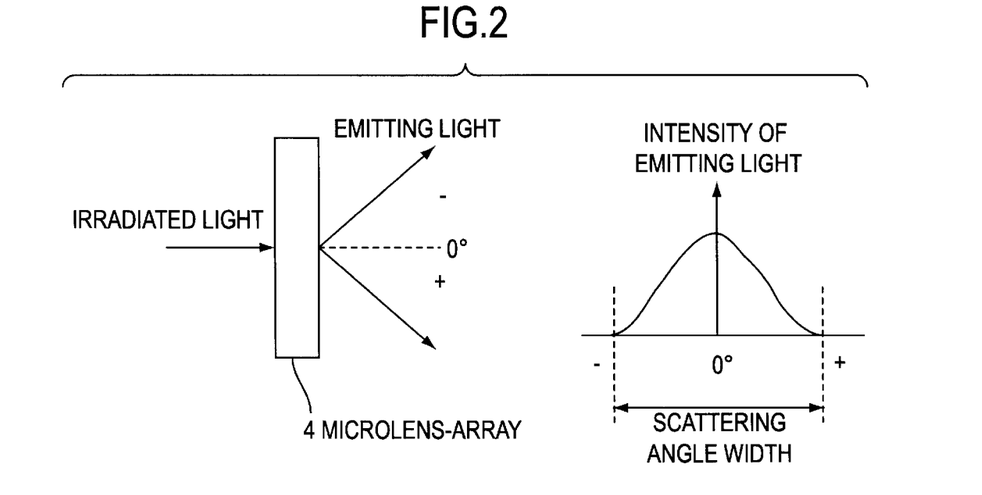
FIG. 2 is a schematic diagram illustrating the concept of measuring a scattering angle width.

(2) Measurement of the scattering angle width of emitted light beam from a microlens-array:

The scattering intensity angle distribution of the emitting light with respect to a white parallel light beam irradiated to a sample was measured with a goniophotometer produced by Murakami Shikisai Gijutsu Kenkyujo as illustrated in FIG. 2 to find the scattering angle width of the emitting light.

(3) Measurement of a viewing angle (part 1)

Figure 3:
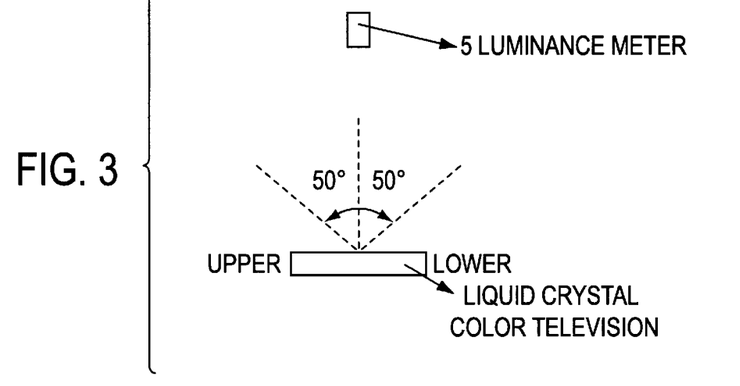
FIG. 3 is a schematic diagram illustrating the concept of measuring a viewing angle.

With a liquid crystal color television 4E-L1 produced by Sharp Corp. as the liquid crystal display portion, a white color pattern or a black color pattern was displayed on the entire screen of the liquid crystal color television by means of a Digital Pattern Generator MTSG-1000 produced by Sony Co., Ltd., and the white color luminance of the whole white color pattern and the black color luminance of the whole black color pattern were measured by means of a luminance meter LS-100 produced by Minolta Camera Co., Ltd. from a 50 degree angle in the upper direction to a 50 degree angle in the lower direction with respect to the screen as illustrated in FIG. 3.

A ratio of the white color luminance/black color luminance was defined as the contrast ratio. The angle used to show the contrast ratio$\geq 5$ was represented by a degree to the upper direction and a degree to the lower direction, and was defined as the viewing angle.

(4) Measurement of a viewing angle (part 2)

Figure 5:
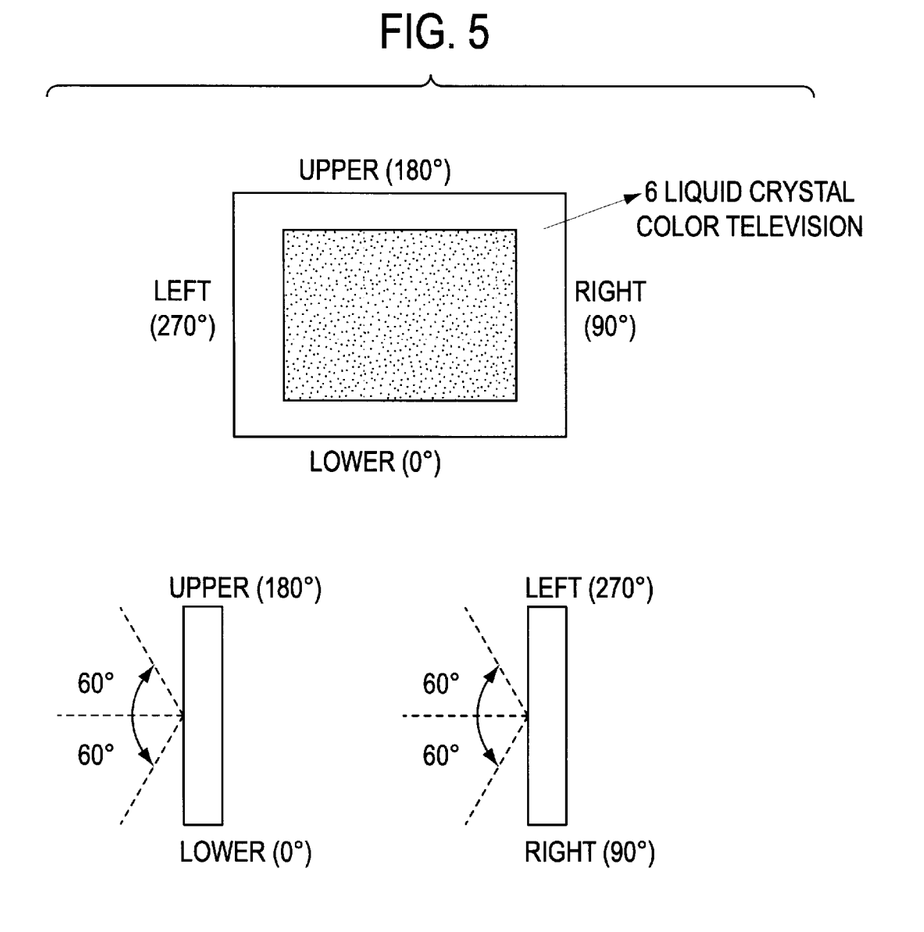
FIG. 5 is a schematic diagram illustrating another concept of measuring the viewing angle.

With a liquid crystal color television 4E-L1 produced by Sharp Corp. as the liquid crystal display portion, white color pattern, black color pattern and eight gray levels pattern was displayed by means of a VG365N Video Pattern Generator produced by AMT Co., Ltd. The contrast ratio in the white/black pattern and the gray scale inversion at eight gray levels were measured with an LCD-7000 produced by Otsuka Denshi Co., Ltd. in the range of 60 degrees both to the upper and lower directions and 60 degrees both to the right and left directions as illustrated in FIG. 5.

The angle to show the contrast ratio$\geq 10$ and the angle at which the gray scale inversion starts were found with respect to the upper and lower directions and the right and left directions, and were defined as the respective viewing angle.

EXAMPLE 1

A black-dyed 200-mesh woven fabric made of polyester fiber with an aperture ratio of 56% and with 32 $\mu$m in diameter of the fiber was fixed on a glass substrate with an adhesive. An acrylate-containing hard coating agent ("Koei Hard M101", resin component: approximately 80%, viscosity: 0.2 Pa·s, produced by Koei Kagaku Co., Ltd.) was applied on the woven fabric as said polymerizable compound having an acrylate group, with a glass bar so as to impregnate the woven fabric, followed by air-drying at a room temperature for about 20 minutes. Then an ultraviolet ray was irradiated with a high pressure mercury lamp for polymerizing said polymerizable compound until the accumulated quantity of light becomes 0.5 J/cm$^2$.

The surface shape of the obtained microlens-array was observed, and the resin at the apertures was confirmed to have a concave lens shape. A parallel light beam was irradiated to the glass substrate side of the microlens-array, and it was confirmed to have a function to broaden the range of the emitting light to about $\pm 30°$.

EXAMPLE 2

A microlens-array was produced using the same conditions as Example 1, except that a black-dyed 140-mesh woven fabric polyester fiber having a aperture ratio of 68% and 32 $\mu$m in diameter of the fiber was used. The surface shape of the obtained microlens-array was observed, and the resin at the apertures was confirmed to have a concave lens shape. A parallel light beam was irradiated to the glass substrate side of the microlens-array, and it was confirmed to have a function to broaden the range of the emitting light to about $\pm 40°$.

EXAMPLE 3

The acrylate-containing hard coating agent of Example 1 was applied on a glass substrate by means of a bar coater (produced by Yoshimitsu Seiki Co., Ltd., #12, material of the mandrel and wire: SUS-304, wire diameter: 0.30 mm). After air-drying at a room temperature for about 20 minutes, a mesh-like sheet of Example 1 was mounted and polymerized as in Example 1.

A parallel light beam was irradiated to the glass substrate side of the obtained microlens-array, and it was confirmed to have a function to broaden the range of the emitting light to about $\pm 30°$.

Furthermore, a parallel light beam was irradiated to the UV irradiation side of the microlens-array, and it was confirmed to have a function to broaden the range of the emitting light to about $\pm 50°$.

Comparative Example 1

Only a mesh-like sheet the same as Example 1 was mounted on a glass substrate and a parallel light beam was irradiated. The effect of broadening the parallel light to wider angle sides was not observed.

Comparative Example 2

A microlens-array was produced using the same materials and conditions as in Example 1 except that a compound obtained by adding 2 phr of an acetophenone-containing photopolymerization initiator ("Darocur 1173" produced by Merck Co., Ltd.) into 100 phr of epoxy acrylate ("NK ester 530A", viscosity at 20° C.: 10 Pa·s or more, produced by Shin Nakamura Kagaku Co., Ltd.) was used as said polymerizable compound having an acrylate group.

The surface shape of the obtained microlens-array was observed, and the resin at the apertures was confirmed to have a substantially flat shape but a concave lens shape was not formed. A parallel light was irradiated, but the effect of broadening the parallel light to wider angle sides was not observed.

EXAMPLE 4

A microlens-array was prepared using the same materials and conditions as in Example 3, except that a black-dyed 140-mesh woven fabric polyester fiber having an aperture ratio of 68% and 32 µm in diameter of the fiber was used.

Figure 4:
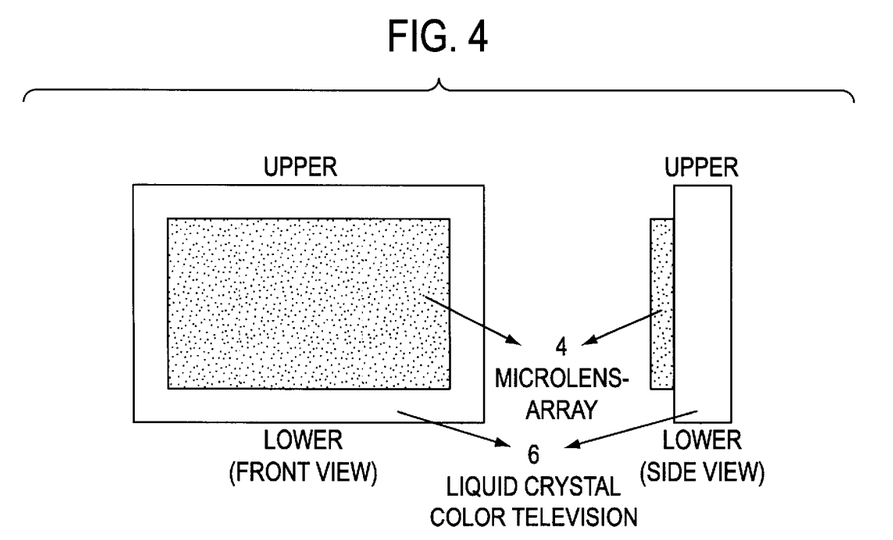
FIG. 4 is a schematic diagram illustrating the microlens-array mounted on a liquid crystal color television.

A parallel light beam was irradiated to the UV irradiation side of the obtained microlens-array, and it was confirmed to have a function to broaden the range of the emitting light to about ±40°. The microlens-array was mounted to a liquid crystal color television with the UV irradiation side facing the display portion to measure the viewing angle as illustrated in FIG. 4. The results are shown in Table 1.

EXAMPLE 5

The microlens-array obtained in Example 3 was mounted to a liquid crystal color television with the UV irradiation side facing the display portion to measure the viewing angle. The results are shown in Tables 1, 2 and 3.

EXAMPLE 6

A microlens-array was produced using the same materials and conditions as in Example 4, except that a black-dyed 250-mesh woven fabric polyester fiber having a aperture ratio of 53% and a 28 µm in diameter of the fiber was used as a polyester woven fabric. A parallel light beam was irradiated to the UV irradiation side of the obtained microlens-array, and it was confirmed to have a function to broaden the range of the emitting light to about ±40°. The microlens-array was mounted to a liquid crystal color television with the UV irradiation side facing the display portion to measure the viewing angle. The results are shown in Table 1.

EXAMPLE 7

A microlens-array was produced using the same materials and conditions as in Example 4, except that a different bar coater was used (produced by Yoshimitsu Seiki Co., Ltd., #10, material of the mandrel and wire: SUS-304, wire diameter: 0.25 mm). A parallel light beam was irradiated to the UV irradiation side of the obtained microlens-array, and it was confirmed to have a function to broaden the range of the emitting light to about ±50°. The microlens-array was mounted to a liquid crystal color television with the UV irradiation side facing the display portion to measure the viewing angle. The results are shown in Table 1.

EXAMPLE 8

The microlens-array obtained in Example 7 was detached from the glass substrate. Then using only the mesh-like sheet impregnated with the resin, the viewing angle was measured as in Example 7. The results are shown in Tables 1, 2 and 3.

EXAMPLE 9

A saponified triacetyl cellulose film (thickness: approximately 80 µm) was applied with the same acrylate-containing hard coating agent as Example 1 so that the film thickness after curing becomes 6 µm. A mesh-like sheet was mounted, then the resin was cured using the same conditions as in Example 4. A parallel light beam was irradiated to the UV irradiation side of the obtained microlens-array, and it was confirmed to have a function to broaden the range of the emitting light to about ±30°. The microlens-array was mounted to a liquid crystal color television with the UV irradiation side facing the display portion to measure the viewing angle. The results are shown in Table 1.

EXAMPLE 10

A microlens-array was produced using the same materials and conditions as in Example 9, except that the acrylate-containing hard coating agent was applied so that the film thickness after curing became 7 µm. A parallel light beam was irradiated to the UV irradiation side of the obtained microlens-array, and it was confirmed to have a function to broaden the range of the emitting light to about ±40°. The microlens-array was mounted to a liquid crystal color television with the UV irradiation side facing the display portion to measure the viewing angle. The results are shown in Table 1.

EXAMPLE 11

A microlens-array was produced using the same materials and conditions as in Example 9, except that the acrylate-containing hard coating agent was applied so that the film thickness after curing became 13 µm. A parallel light beam was irradiated to the UV irradiation side of the obtained microlens-array, and it was confirmed to have a function to broaden the range of the emitting light to about ±50°. The microlens-array was mounted to a liquid crystal color television with the UV irradiation side facing the display portion to measure the viewing angle. The results are shown in Table 1.

EXAMPLE 12

A microlens-array was produced using the same materials and conditions as in Example 9, except that the acrylate-containing hard coating agent was applied so that the film thickness after curing becomes 15 µm. A parallel light beam was irradiated to the UV irradiation side of the obtained microlens-array, and it was confirmed to have a function to broaden the range of the emitting light to about ±50°. The microlens-array was mounted to a liquid crystal color television with the UV irradiation side facing the display portion to measure the viewing angle. The results are shown in Table 1.

EXAMPLE 13

A microlens-array was produced using the same materials and conditions as in Example 9, except that the acrylate-containing hard coating agent was applied so that the film thickness after curing becomes 22 µm. A parallel light beam was irradiated to the UV irradiation side of the obtained microlens-array, and it was confirmed to have a function to broaden the range of the emitting light to about ±40°. The microlens-array was mounted to a liquid crystal color television with the UV irradiation side facing the display portion to measure the viewing angle. The results are shown in Table 1.

Comparative Example 3

The viewing angle of a liquid crystal color television 4E-L1 produced by Sharp Corp. was measured without mounting a microlens-array of the present invention. The results are shown in Tables 1, 2 and 3.

[TABLE 1]

| | Viewing angle | | |
|---|---|---|---|
| | Upper direction | Lower direction | Viewing angle width |
| Example 4 | 35° | 35° | 70° |
| Example 5 | >50° | >50° | >100° |
| Example 6 | 40° | 40° | 80° |
| Example 7 | >50° | >50° | >100° |
| Example 8 | >50° | >50° | >100° |
| Example 9 | 30° | 30° | 60° |
| Example 10 | >50° | >50° | >100° |
| Example 11 | >50° | >50° | >100° |
| Example 12 | 40° | 45° | 85° |
| Example 13 | 35° | 40° | 75° |
| Comparative Example 3 | 20° | 30° | 50° |

[TABLE 2]

| | Viewing angle Upper and Lower (180°–0°) | | | |
|---|---|---|---|---|
| | Contrast ratio ≧10 | | Gray scale inversion | |
| | Upper direction | Lower direction | Upper direction | Lower direction |
| Example 5 | 46° | 27° | >60° | 50° |
| Example 8 | 35° | 22° | >60° | >60° |
| Comparative Example 3 | 25° | 20° | 15° | 30° |

[TABLE 3]

| | Viewing angle Right and Left (270°–90°) | | | |
|---|---|---|---|---|
| | Contrast ratio ≧10 | | Gray scale inversion | |
| | Left direction | Light direction | Left direction | Light direction |
| Example 5 | >60° | >60° | >60° | >60° |
| Example 8 | >60° | >60° | >60° | >60° |
| Comparative Example 3 | 43° | 43° | 25° | 25° |

While the invention has been described in detail and with reference to specific embodiments thereof, it will be apparent to one skilled in the art that various changes and modifications can be made without departing from the spirit and scope thereof.

What is claimed is:

1. A microlens-array comprising a mesh-like sheet and an optically-transparent resin formed at apertures of the mesh-like sheet, wherein the optically-transparent resin formed at each aperture has a concave lens shape and wherein the optically-transparent resin is prepared by polymerizing at least one polymerizable compound or a composition containing the at least one polymerizable compound, wherein the at least one polymerization compound and the composition containing the at least one polymerization compound each has a viscosity of 5 Pa·s or less prior to polymerization.

2. The microlens-array according to claim 1, wherein the mesh-like sheet has a mesh size of from 100 to 600 mesh.

3. The microlens-array according to claim 1, wherein the mesh-like sheet is covered or dyed with a shading material.

4. The microlens-array according to claim 1, wherein the mesh-like sheet comprises a woven fabric.

5. The microlens-array according to claim 1, wherein the mesh-like sheet comprises printing lattices made by screen printing.

6. The microlens-array according to claim 1, wherein the mesh-like sheet comprises fibers selected from the group consisting of cotton, linen, silk, nylon, polyester, polyethylene, polypropylene, stainless steel and glass fibers.

7. The microlens-array according to claim 6, wherein the mesh-like sheet comprises fibers selected from the group consisting of nylon and polyester fibers.

8. The microlens-array according to claim 1, wherein the at least one polymerization compound and the composition containing the at least one polymerization compound each has a viscosity of 3 Pa·s or less prior to polymerization.

9. The microlens-array according to claim 1, wherein the wherein the optically-transparent resin formed at each aperture has a plano-concave lens shape.

10. A method of producing a microlens-array, comprising the steps of:
   (i) mounting a mesh-like sheet on an optically-transparent substrate;
   (ii) applying at least one polymerizable compound or a composition containing the at least one polymerizable compound onto the mesh-like sheet, wherein the at least one polymerization compound and the composition containing the at least one polymerization compound each has a viscosity of 5 Pa·s or less prior to polymerization, and wherein the at least one polymerizable compound is formed at each aperture of the mesh-like sheet, has a concave lens shape at each aperture and is optically-transparent upon polymerization thereof; and
   (iii) polymerizing the at least one polymerizable compound.

11. The microlens-array according to claim 10, wherein the mesh-like sheet comprises a woven fabric.

12. The method of producing a microlens-array according to claim 10, wherein the mesh-like sheet comprises printing lattices made by screen printing.

13. The method of producing a microlens-array according to claim 10, wherein the mesh-like sheet comprises fibers selected from the group consisting of cotton, linen, silk, nylon, polyester, polyethylene, polypropylene, stainless steel and glass fibers.

14. The method of producing a microlens-array according to claim 13, wherein the mesh-like sheet comprises fibers selected from the group consisting of nylon and polyester fibers.

15. The method of producing a microlens-array according to claim 10, wherein the at least one polymerization compound and the composition containing the at least one polymerization compound each has a viscosity of 3 Pa·s or less prior to polymerization.

16. The method of producing a microlens-array according to claim 10, wherein the optically-transparent resin formed at each aperture has a plano-concave lens shape.

17. The method of producing a microlens-array according to claim 10, further comprising the step of applying heat during the applying step (ii).

18. A method of producing a microlens-array, comprising the steps of:
(i) applying at least one polymerizable compound or a composition containing the at least one polymerizable compound to an optically-transparent substrate, wherein the at least one polymerization compound and the composition containing the at least one polymerization compound each has a viscosity of 5 Pa·s or less prior to polymerization, and wherein the at least one polymerizable compound is optically-transparent upon polymerization thereof;
(ii) mounting a mesh-like sheet thereon, wherein the at least one polymerizable compound is formed at each aperture of the mesh-like sheet and has a concave lens shape at each aperture; and
(iii) polymerizing the at least one polymerizable compound.

19. The microlens-array according to claim 18, wherein the mesh-like sheet comprises a woven fabric.

20. The method of producing a microlens-array according to claim 18, wherein the mesh-like sheet comprises printing lattices made by screen printing.

21. The method of producing a microlens-array according to claim 18, wherein the mesh-like sheet comprises fibers selected from the group consisting of cotton, linen, silk, nylon, polyester, polyethylene, polypropylene, stainless steel and glass fibers.

22. The method of producing a microlens-array according to claim 21, wherein the mesh-like sheet comprises fibers selected from the group consisting of nylon and polyester fibers.

23. The method of producing a microlens-array according to claim 18, wherein the at least one polymerization compound and the composition containing the at least one polymerization compound each has a viscosity of 3 Pa·s or less prior to polymerization.

24. The method of producing a microlens-array according to claim 18, wherein the wherein the optically-transparent resin formed at each aperture has a plano-concave lens shape.

25. The method of producing a microlens-array according to claim 18, further comprising the step of applying heat during the steps (i) and (ii).

26. A liquid crystal display device comprising a light source unit, a liquid crystal cell and a microlens-array provided at the side from which the liquid crystal cell is observed by an observer, wherein the microlens-array comprises a mesh-like sheet and an optically-transparent resin formed at apertures of the mesh-like sheet, and wherein the optically-transparent resin formed at each aperture of the mesh-like sheet has a concave lens shape, wherein the optically-transparent resin is prepared by polymerizing at least one polymerizable compound or a composition containing the at least one polymerizable compound, wherein the at least one polymerization compound and the composition containing the at least one polymerization compound each has a viscosity of 5 Pa·s or less prior to polymerization.

27. The liquid crystal display device according to claim 26, wherein the microlens-array is provided directly on a substrate comprising the liquid crystal cell.

28. The liquid crystal display device according to claim 26, wherein the mesh-like sheet has a mesh size of from 100 to 600 mesh.

29. The liquid crystal display device according to claim 26, wherein the mesh-like sheet is covered or dyed with a shading material.

30. The liquid crystal display device according to claim 26, wherein the mesh-like sheet comprises a woven fabric.

31. The liquid crystal display device according to claim 26, wherein the mesh-like sheet comprises printing lattices made by screen printing.

32. The liquid crystal display device according to claim 26, wherein the mesh-like sheet comprises fibers selected from the group consisting of cotton, linen, silk, nylon, polyester, polyethylene, polypropylene, stainless steel and glass fibers.

33. The liquid crystal display device according to claim 32, wherein the mesh-like sheet comprises fibers selected from the group consisting of nylon and polyester fibers.

34. The liquid crystal display device according to claim 26, wherein the at least one polymerization compound and the composition containing the at least one polymerization compound each has a viscosity of 3 Pa·s or less prior to polymerization.

35. The liquid crystal display device according to claim 26, wherein the wherein the optically-transparent resin formed at each aperture has a plano-concave lens shape.

36. A liquid crystal display device comprising a light source unit, a back side polarizing plate, a liquid crystal cell, a front side polarizing plate and a microlens-array, wherein the microlens-array is provided at the side from which the liquid crystal cell is observed by an observer and is located closer to the observer than the front side polarizing plate; and wherein the microlens-array comprises a mesh-like sheet and an optically-transparent resin formed at apertures of the mesh-like sheet and the optically-transparent resin formed at each aperture has a concave lens shape, wherein the optically-transparent resin is prepared by polymerizing at least one polymerizable compound or a composition containing the at least one polymerizable compound, wherein the at least one polymerization compound and the composition containing the at least one polymerization compound each has a viscosity of 5 Pa·s or less prior to polymerization.

37. The liquid crystal display device according to claim 36, wherein the microlens-array is provided directly on the front side polarizing plate.

38. The liquid crystal display device according to claim 36, wherein the mesh-like sheet has a mesh size of from 100 to 600 mesh.

39. The liquid crystal display device according to claim 36, wherein the mesh-like sheet is covered or dyed with a shading material.

40. The liquid crystal display device according to claim 36, wherein the mesh-like sheet comprises a woven fabric.

41. The liquid crystal display device according to claim 36, wherein the mesh-like sheet comprises printing lattices made by screen printing.

42. The liquid crystal display device according to claim 36, wherein the mesh-like sheet comprises fibers selected from the group consisting of cotton, linen, silk, nylon, polyester, polyethylene, polypropylene, stainless steel and glass fibers.

43. The liquid crystal display device according to claim 42, wherein the mesh-like sheet comprises fibers selected from the group consisting of nylon and polyester fibers.

44. The liquid crystal display device according to claim 36, wherein the at least one polymerization compound and the composition containing the at least one polymerization compound each has a viscosity of 3 Pa·s or less prior to polymerization.

45. The liquid crystal display device according to claim 36, wherein the wherein the optically-transparent resin formed at each aperture has a plano-concave lens shape.

* * * * *